Feb. 20, 1945.                C. B. LEAPE                2,370,051
                         SCRAPER HEAD FOR WIRE
                          Filed Jan. 12, 1944
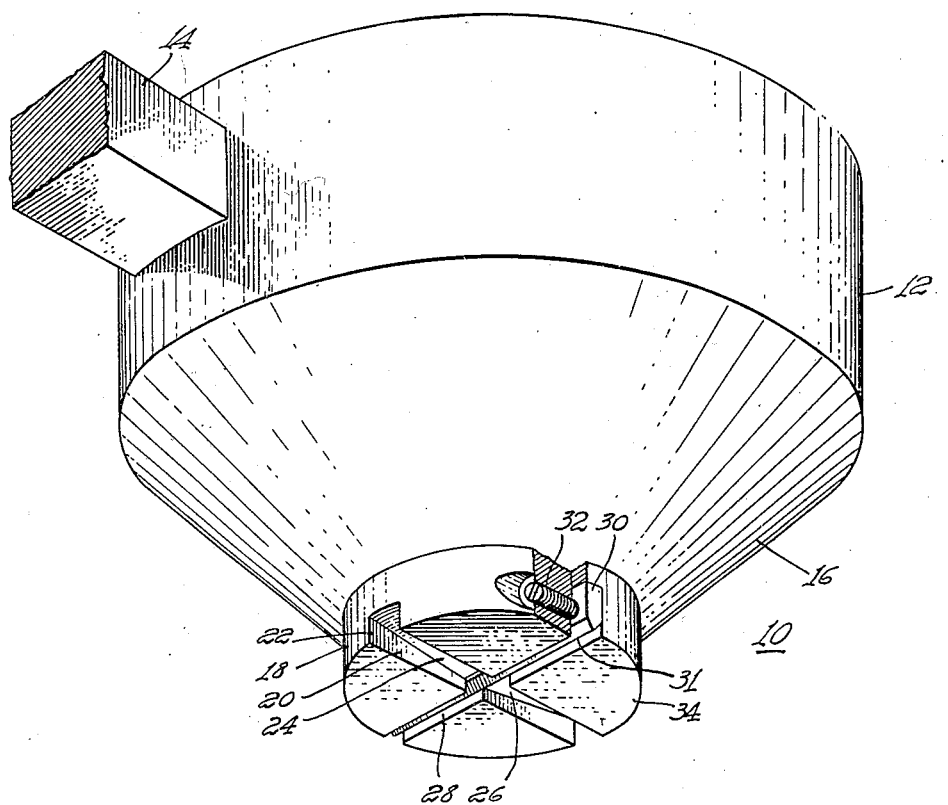
WITNESSES:                                          INVENTOR
                                                 Charles B. Leape.
                                              BY
                                                    ATTORNEY Patented Feb. 20, 1945

2,370,051

UNITED STATES PATENT OFFICE 2,370,051

SCRAPER HEAD FOR WIRE

Charles B. Leape, Forest Hills, Pa., assignor to Westinghouse Electric & Manufacturing Company, East Pittsburgh, Pa., a corporation of Pennsylvania Application January 12, 1944, Serial No. 517,925

3 Claims. (Cl. 73—7)

This invention relates to a testing apparatus and, more particularly, to an improved scraper head for use in enameled wire testing machines and the like.

In determining the properties of enameled coatings on wire, a generally accepted indication of its toughness, hardness, and adhesion to the wire is provided by scraping the enamel under predetermined loads until such a load is imposed that the enamel is scraped off the wire. Such tests are important in determining the usefulness and other related characteristics of any particular enamel.

In order to provide a satisfactory measure of the relative qualities of any two wire enamels, it is necessary that the tests be reproduceable for the same wire enamel and accurately indicate the differences in the physical properties where different wire enamels are being compared. One of the defects of prior art scrape-testing machines resided in the inaccurate and changeable characteristics of the knife-edge applied to the enameled wire being tested. A common form of knife-edge heretofore employed consisted of a length of piano wire soldered or welded to a scraper head. The soldering or welding has been found to affect the temper and hardness of the wire, such, for example, as piano wire, to such an extent that some 300 tests of enameled wire passing thereunder results in appreciable wear and other changes in the shape and form of the wire. Where the wire is soldered at both ends only, a particularly aggravating defect has been found in that the wire bows during the test, such bowing varying in proportion to load and other testing conditions. It will be obvious that reproduceability and accurate comparative results are not obtainable with these previously employed scraper heads.

The object of this invention is to provide for an accurate, long-lasting scraper head suitable for use in enameled wire testing machines.

Other objects of the invention will, in part, be obvious and will, in part, appear hereinafter.

For a fuller understanding of the nature and objects of the invention, reference should be had to the single figure of the drawing showing in perspective a partially broken view of the scraper head forming the present invention.

Referring to the drawing, the scraper head 10 comprises a main body 12 which may be of any suitable metal supported from a pivot arm 14 for unrestrained vertical movement. The body 12 is adapted to carry on the upper surface thereof suitable weights for giving any desired load. A conical portion 16 is formed on the underside of the body 12 and terminates in a relatively cylindrical projection 18. The cylindrical projection 18 is provided with a longitudinal channel 20 having vertical walls 22 for the passage of enameled wire being subjected to a test under the scraper head 10. The channel 20 is provided with relatively sloping upper walls 24 and 26 to accommodate scrapings of enamel in order to prevent the scrapings accumulating sufficiently to lift the head and affecting the accuracy of the test.

The projection 18 is provided with a rectangular slot 28 disposed transversely to the channel 20. Within the slot 28 a relatively flat knife-edge 30 is arranged for slidable movement therein. The knife-edge 30 is held within any predetermined position by the setscrew 32, a similar setscrew being preferably arranged on the opposite side of channel 20. The setscrews 32 are applied against the flat sides of the knife-edge.

The projection 18 has a flat face 34 for resting on some portion of the testing machine with which it is associated. In order to prevent damage to the knife-edge 30, the slot 28 is deeper than the depth of the knife-edge 30 so that when the knife-edge is seated within the slot, no portion thereof will extend beyond the face 34. Thus, if the head is dropped purposely or accidentally, the knife-edge will not be subject to damage.

The knife-edge 30 is provided with a ridge 31 extending along the whole length thereof to form the scraping element of the knife-edge. The ridge 31 is rounded to a small radius, such roundness resulting in a better life. A radius of 0.0045 inch has been found to be satisfactory for the knife-edge of this invention. The radius may be changed in order to meet requirements of the particular application.

The knife-edge 30 is preferably made from some extremely hard wear-resisting substance. A particularly desirable material is tungsten carbide molded and ground to shape. Various metallic carbides or mixtures thereof, such, for example, as tungsten carbide, tantalum carbide, and boron carbide, and the like may be employed for this purpose.

In use, the knife-edge 30 is slipped into slot 28 and held in position by the setscrews 32. A portion of the ridge 31 will extend into the channel 20 for contact with enameled wire being tested. About 1500 tests of the enameled wire may be tested before any appreciable wear of the knife-edge will be apparent. When worn, the knife-edge may be easily shifted slightly in slot 30 by loosening setscrews 32, and a new ridge portion on the knife edge will be available for effecting the same number of tests. In this way, the testing head shown and described may be employed for testing a large quantity of enameled wire with a minimum of effort. By comparison, prior art testing heads are either replaced entirely or the wire knife-edge completely replaced when the knife-edge employed therein deteriorated. The expense and trouble of resoldering wire knife-edges are obviated by the pressure head of the present invention.

A convenient method of determining whether the knife-edge is worn with use is to use as a standard well aged enameled wire, preferably from the same spool, to compare with the scrape value of the standard when a fresh edge is in channel 28. A change of one ounce in scrape value may be noted after some 1500 tests have been made. Upon moving the knife-edge to a new position, the scrape value of the standard enameled wire will return to its original value.

After the entire ridge of the knife-edge has been worn, it may be reground and reused.

While the knife-edge 30 has been shown as being relatively flat, it will be apparent that other geometrical forms and shapes may be employed in a similar manner. Furthermore, instead of constructing the entire knife-edge 30 of the extremely hard carbides, it may be feasible to only construct the ridge portion 31 of a hard carbide and braze such ridge portion to a less expensive strip or base to produce the knife-edge.

Since certain changes may be made in the above invention and different embodiments thereof can be made without departing from the scope thereof, it is intended that all matter contained in the above description or taken in connection with the accompanying drawing shall be interpreted as illustrative and not in a limiting sense.

I claim as my invention:

1. A scraper head for use in testing enameled wire under load comprising, in combination, a body provided with means for supporting weights thereon, a projection on the body, the projection being provided with both a channel for passage of enameled wire being tested and a slot transverse to the channel, a knife-edge disposed in the slot for slidable positioning therein, and holding means for retaining the knife-edge in a predetermined position with respect to the channel, the edge of the knife-edge being disposed parallel to the direction of the slot.

2. A scraper head for use in testing enameled wire under load comprising, in combination, a body for supporting weights thereon, a projection on the body, the projection being provided with both a channel for passage of enameled wire being tested and a slot transverse to the channel, a knife-edge disposed in the slot for slidable positioning therein, and holding means for retaining the knife-edge in a predetermined position with respect to the channel, the knife-edge being of an extremely hard and wear-resisting substance similar to tungsten carbide.

3. A scraper head for use in testing enameled wire under load comprising, in combination, a body for supporting weights thereon, a projection on the body, the projection being provided with both a channel for passage of enameled wire being tested and a slot transverse to the channel, a relatively flat knife-edge disposed in the slot for slidable positioning therein, the knife-edge having a rounded ridge portion extending across the channel, the knife-edge being of less depth than the slot whereby the ridge portion does not project beyond the contour of the projection, and holding means for retaining the knife-edge in a predetermined position with respect to the channel, the knife-edge being of an extremely hard and wear-resisting substance similar to tungsten carbide.

CHARLES B. LEAPE.